United States Patent [19]
Blazej

[11] Patent Number: 4,733,328
[45] Date of Patent: Mar. 22, 1988

[54] PROCESS FOR MANUFACTURING CAPACITIVE DEVICES AND CAPACITIVE DEVICES MANUFACTURED BY THE PROCESS

[75] Inventor: Daniel C. Blazej, Baldwinsville, N.Y.

[73] Assignee: Allied Corporation, Morris Township, Morris County, N.J.

[21] Appl. No.: 943,526

[22] Filed: Dec. 18, 1986

Related U.S. Application Data

[62] Division of Ser. No. 653,252, Sep. 24, 1984, abandoned.

[51] Int. Cl.[4] .................. H01G 1/01; H01G 3/06
[52] U.S. Cl. .................................. 361/320; 29/25.42
[58] Field of Search .............. 361/320, 321, 304, 305, 361/306; 29/25.42

[56] References Cited

U.S. PATENT DOCUMENTS

| | | | |
|---|---|---|---|
| 3,267,342 | 8/1966 | Pratt et al. | 361/321 |
| 3,273,033 | 9/1966 | Rossmeisl | 361/329 X |
| 3,483,447 | 12/1969 | Nolta et al. | 361/321 |
| 3,619,744 | 11/1971 | Stephenson | 361/305 X |
| 3,784,887 | 1/1974 | Sheard | 361/321 X |
| 3,878,443 | 4/1975 | Girard et al. | 361/320 |
| 3,902,102 | 8/1975 | Burn | 361/305 |
| 4,631,633 | 12/1986 | Shaulov et al. | 361/321 |

*Primary Examiner*—Donald A. Griffin
*Attorney, Agent, or Firm*—Richard C. Stewart; Gerhard H. Fuchs

[57] ABSTRACT

This invention relates to a laminated capacitive element for use in electrical devices such as filtered connectors, said element comprising a laminated body of a metal substrate having one or more layered structures heat bonded to all or a portion of the surfaces thereof, said structures comprising a non-conductive layer composed of a sintered finely divided non-conductive material heat bonded to said metal substrate and a metal conductive layer composed of sintered finely divided metal heat bonded to said sintered non-conductive material.

34 Claims, 2 Drawing Figures

PROCESS FOR MANUFACTURING CAPACITIVE DEVICES AND CAPACITIVE DEVICES MANUFACTURED BY THE PROCESS

This application is a division of application Ser. No. 653,252, filed Sept. 24, 1984, and now abandoned.

BACKGROUND OF INVENTION

1. Field of the Invention

This invention relates to a novel process of manufacturing capacitive devices. The process of this invention is especially useful for manufacturing the capacitive elements of filtered connectors. Another aspect of this invention relates to capacitive devices prepared in accordance with the process of this invention and their use in the manufacture of filtered connectors and other electrical devices which incorporate capacitive devices.

2. Prior Art

Capacitive devices are elements of electrical devices which exhibit the property of a non-conductor that permit the storage of energy as a result of electric displacement when opposite surfaces of the nonconductor are maintained at a difference of potential. Capacitive devices have many uses in electrical circuits. For example, such devices are useful in the construction of capacitor telephones. Moreover, capacitors have also found extensive use in the construction of filtered connectors.

In each of the above-referenced electrical devices, the capacitive device is used to control electromagnetic interference, a problem which is frequently encountered by users of electronic equipment. For example, the receipt and transmission of electromagnetic interference may be reduced or eliminated by utilization of filtered connectors with electronic equipment. Noise, or electromagnetic interference, generated in the circuitry of an electrical device can be deleterious to the operation of other devices if allowed to escape the confines of the device. This problem can be eliminated by shielding the electrical device, connectors and/or cables, and/or by filtering transmission lines.

Filtering is an especially effective way of eliminating the problem, and can be most conveniently accomplished by providing filtering devices at the connection points between the electrical devices. In addition to preventing the out-flow of undesirable signals from a device, the filter also prevents the inflow of such signals to these devices.

In general, filtered connectors can be high pass, low pass or band pass in function. Essentially all conventional filter connectors are based on low pass filters in which a combination of capacitors and inductors provide the filtering function. In these filtered connectors, the circuit usually consists of a capacitor with one plate in electrical contact with a pin, and another plate which contacts the ground. A dielectric material is positioned between the two plates and contacted with same.

Several sub-classes of such capacitance filter connectors are known. One such sub-class is those connectors in which the capacitors are coaxial with the pins. In these connectors, the inner surface of a dielectric cylinder is coated with a conductive material which contacts the pin. The outer surface of the cylinder is similarly coated with a conductive material which contacts the ground plane. Such filter connectors and methods for their manufacture are described in more detail in U.S. Pat. Nos. 4,187,481; 4,198,613; and 3,379,155.

Another sub-class of capacitance filter connectors have been designated planar array ceramic capacitors. Exemplary of this sub-class of connectors are those described in U.S. Pat. Nos. 4,407,552; 4,144,509; and 4,083,022. These connectors consist of ceramic blocks with through holes and capacitors built in the ceramic. Pins are inserted through the holes and electrical contact is made between the pins and metallized pads on the surface of the capacitors. These devices are fairly delicate in that the pins are usually soldered to the pads; and this contact can be easily broken.

The third sub-class of conventional capacitance filter connector are monolithic chip capacitors. In these devices, miniature capacitors in the shape of cubic blocks are inserted into holes in a connector body and electrically contacted with the pin. The opposite end of the block is spring contacted with a ground plane. Illustrative of such connectors are those described in U.S. Pat. Nos. 4,371,226 and 4,376,922. One problem associated with these monolithic chip capacitors is that the monolith is fragile. When these capacitors are subjected to a slight force, a circuit path can be easily broken and a very expensive capacitor plate would have to be discarded. Another disadvantage of this design results from the use of a thin metal film as the ground plane. This thin metal film provides little support for mounting the ceramic monolith. Moreover, the reduced mass of the film and the exposure of only the edges of the film reduces its grounding ability and its impedance characteristics.

Methods heretofore used to manufacture capacitors suffer from a number of inherent disadvantages. One of the most pervasive disadvantage results from the difficulty associated with properly bonding the conductive opposing surfaces to the dielectric material. In one of these known methods, the various elements have been bonded together through use of adhesives, as for example epoxy resins. This procedure greatly complicates the manufacture of the elements and prevents easy automation. Moreover, the use of adhesive leads to the provision of an additional dielectric layer, resulting in an overall increase in the thickness of the capacitor, and giving rise to a decrease in the average dielectric constant of the overall dielectric. Furthermore, the adhesives often do not provide a bond between the metal and dielectric material of sufficient strength.

Thus, there is a need for a method of manufacturing capacitors which allows for easy automation, allows for the manufacture of capacitors of simple design and/or which obviates other disadvantages associated with conventional methods of manufacturing capacitors.

SUMMARY OF THE INVENTION

This invention relates to a method of fabricating capacitive elements for use in electrical devices, as for example a filtered connector. More specifically, the method of this invention comprises the steps of:

(a) applying a suspension comprising one or more finely divided non-conductive materials, one or more organic solvents, and one or more heat degradable polymeric binders to all or a portion of one or more surfaces of a metal substrate in a pre-determined pattern;

(b) heating the suspension/metal substrate combination of step (a) at a temperature and for a time sufficient to remove substantially all said solvents from the applied suspension, and sufficient to degrade substantially all of said binders in said applied suspension, sintering said non-conductive material to form a pre-determined pattern of sintered non-conductive material bonded to said surfaces of said metal substrate;

(c) applying a suspension of one or more finely divided metal suspended in one or more organic solvents having one or more polymer binders dissolved therein, to all or a portion of the outer surface of said bonded sintered non-conductive material in a predetermined pattern; and (d) heating said combination of step (c) for a time and at a temperature sufficient to remove substantially all of said solvent from said suspension and sufficient to thermally degrade substantially all of said binders, sintering said conductive material and bonding said sintered conductive material to the outer surface of said nonconductive material.

An alternative embodiment of the method of this invention comprises the steps of:

(a) applying a suspension comprising one or more finely divided non-conductive materials, one or more organic solvents, and one or more heat degradable polymeric binders to all or a portion of one or more surfaces of a metal substrate in a pre-determined pattern;

(b) heating the suspension/metal substrate combination of step (a) at a temperature and for a time sufficient to remove substantially all of said solvents from the applied suspension to form a first coating of a composition comprising said finely divided non-conductive materials and said binders coated on said surfaces of said metal substrate in a predetermined pattern;

(c) applying a suspension of one or more finely divided metal suspended in one or more organic solvents having one or more polymer binders dissolved therein, to all or a portion of the outer surface of said first coating in a predetermined pattern;

(d) heating said combination of step (c) for a time and at a temperature sufficient to remove substantially all of said solvent from said suspension to form a second coating of a composition comprising said finely divided metal and said binders coated on said surface of said first coating in a predetermined pattern; and (e) heating said combination of step (d) at a temperature and for a time sufficient to thermally degrade substantially all of said binders in said first and second coatings, sintering said finely divided metals and said finely divided non-conductive materials and heat bonding said sintered non-conductive material to said surfaces of said metal substrate, and heat bonding said sintered finely divided metal to the surfaces of said sintered non-conductive material.

Another aspect of this invention relates to the capacitor manufactured through use of the process of this invention. The laminated capacitive device of this invention comprises:

a laminated body comprising a metal substrate having one or more layered structures heat bonded to one or more surfaces thereof, said structures comprising non-conductive layer comprised of sintered finely divided non-conductive material heat bonded to one or more surfaces of said metal substrate in a predetermined pattern, and a layer of sintered finely divided metal heat bonded to all or a portion of the surface of said sintered non-conductive material.

The methods and device of this invention obviate many of the disadvantages heretofore associated with the conventional capacitors and their manufacture. For example, contrary to the thin film which forms the ground plane for the ceramic monolith of U.S. Pat. No. 4,376,922, the metal ground plate of the capacitive device of this invention provides a massive ground source and a low impedance-to-ground (i.e., resistance). The thickness (i.e., mass) of this metal ground plate enhances grounding, and contrary to the thin ground plane of the monolithic capacitor provides good support for the dielectric ceramic material. Furthermore, through use of the method of this invention the capacitive element of this invention which is of simple design and which is not susceptible to mechanical failure can be manufactured. Moreover, the method of this invention provides for easy manufacture of such capacitive elements and easily adapts for automation.

BRIEF DESCRIPTION OF THE DRAWINGS

Referring to the drawings.

DESCRIPTION OF THE PREFERRED EMBODIMENTS

Figure 1:
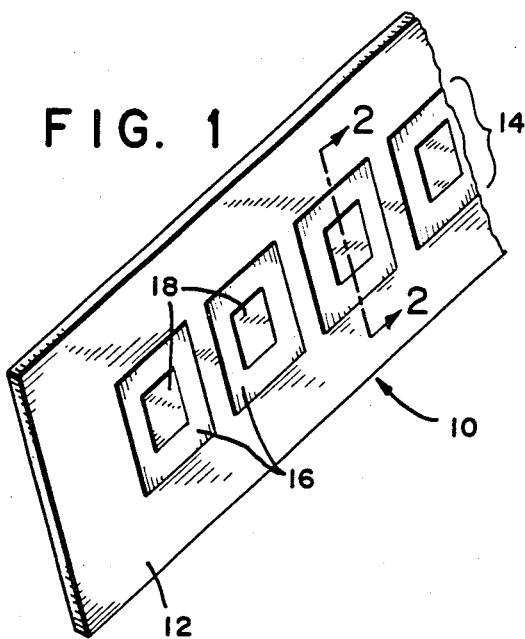
FIG. 1 is a perspective view of a preferred capacitive device of this invention.
Figure 2:
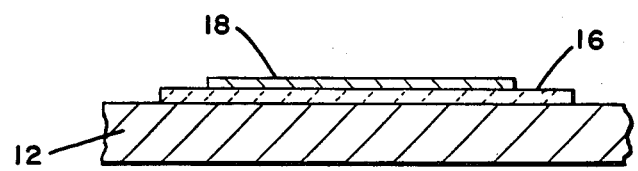
FIG. 2 is an enlarged latitudinal sectional view of the capacitive element of FIG. 1 taken along line 2—2.

Referring to FIGS. 1 and 2, a capacitive device in accordance with the present invention is indicated at 10. Capacitive device 10 includes conductive layer 12 having one or more layered structures 14 heat bonded to a surface of layer 12. In the preferred embodiments of the invention depicted in FIGS. 1 and 2, conductive layer 12 consists of an elongated solid metal strip. Layer 12 is composed of a metal such as copper, gold, nickel, silver, palladium, platinum, iron, aluminum and the like. Copper is the preferred metal for use in the construction of conductive layer 12. In general, the thickness of layer 12 will vary from about 0.025 mm to about 0.75 mm. In the preferred embodiments of the invention, layer 12 is from about 0.075 mm to about 0.6 mm in thickness and in the particularly preferred embodiments is from about 0.125 mm to about 0.5 mm in thickness. Amongst these particularly preferred embodiments, most preferred are those embodiments in which the thickness of layer 12 is from about 0.2 mm to about 0.4 mm.

One or more layered structures 14 are heated bonded to the surface of a conductive layer 12. Structures 14 are composed of a non-conductive layer 16 and a conductive layer 18.

Non-conductive layer 16 is composed of finely divided "non-conductive material" which has been heat sintered and bonded to conductive layer 12. As used herein, "non-conductive materials" are materials which are substantially non-conducting to electrical current and which are capable of functioning as dielectric materials in a capacitive device. The type of non-conducting material employed is not critical and can be varied widely. Usually, the non-conductive materials employed in the conduct of the process of this invention are those which are normally used as dielectric materials in conventional capacitors and will usually have a dielectric constant of from about 1 to about 30,000, and preferably from about 2 to about 15,000. In the particularly preferred embodiments of this invention, the dielectric material of choice will have a dielectric constant of from about 200 to about 5,000 and in the most preferred embodiments of the invention will have a dielectric constant of from about 400 to about 2,000. Illustrative of useful materials which can be employed as non-conductive materials in the practice of the invention are ceramics such as metal and non-metal oxides, such as magnesium oxide, aluminates, calcium oxide, titanium oxide, aluminum oxide, zirconium oxide, oxide containing clays, silicon dioxide, tungsten oxide; synthetic ceramics such as silicon carbides, aluminum carbide, tungsten carbide, iron carbide, calcium boride, barium boride, aluminum nitride, and iron nitride; ferro-electric materials such as barium titanate, strontium titanate, lead titanate, calcium titanate, calcium stannate, lead magnesium niobate, lead magnesium tungstate, barium potassium titanium niobate, calcium zirconate, and sodium tantalate; glasses such as silicate glasses, borate glasses and germanate glasses; and the like.

Preferred for use in the practice of this invention are ferroelectric materials either alone or in combination with one or more glasses, and particularly preferred for use are ferroelectric materials especially titanate and niobate types either alone or in combination with one or more glasses. Most preferred for use in the practice of this invention are ceramics of the titanate type in admixture with one or more glasses, with barium titanate ceramic compositions containing barium titanate usually the ceramic of choice.

The thickness of non-conductive layer 16 can vary widely. In general, layer 16 is from about 0.020 mm to about 0.100 mm in thickness. In the preferred embodiments of this invention, the thickness of layer 16 is from about 0.025 mm to about 0.085 mm, and in the particularly preferred embodiments is from about 0.030 mm to about 0.070 mm. Amongst these particularly preferred embodiments of the invention the thickness of layer 16 is from about 0.040 mm to about 0.060 mm.

Conductive layer 18 consists of finely divided metal which has been sintered and heat bonded to the surface of non-conductive layer 16. The type of metal which can be used in the construction of layer 18 can vary widely. Illustrative of useful metals are copper, nickel, palladium, platinum, iron, silver, aluminum, gold and the like. Copper is the preferred metal for use in the construction layer 18.

Thickness of layer 18 can vary widely. Usually layer 18 has a thickness of from about 0.005 to about 0.075 mm. In the preferred embodiments of the invention, the thickness of layer 18 is from about 0.01 to about 0.06 mm, and in the particularly preferred embodiments is from about 0.015 to about 0.05 mm. Amongst these particularly preferred embodiments, most preferred are those embodiments in which the thickness of layer 18 is from about 0.02 to about 0.03 mm.

The capacitive device of this invention can be manufactured through use of the methods of this invention. In the first step of the process of this invention a suspension containing one or more finely divided "non-conductive materials", one or more "thermally degradable polymeric organic binders" and "an amount of one or more organic solvents" sufficient to dissolve said polymeric organic binder to disperse said one or more non-conductive materials is applied to one or more surfaces of a metal. The type of non-conductive material employed in the practice of this invention are as described above. The non-conductive materials are used in the form of finely divided particles. In the preferred embodiments of the invention the materials are in the form of finely divided spherical or substantially spherical particles having an average diameter of not more than about 5 micrometers, and in the particularly preferred embodiments such materials are in the form of finely divided spherical or substantially spherical particles having an average diameter of less than about 2 micrometers. Amongst these particularly preferred embodiments most preferred are those embodiments in which non-conductive materials are in the form of finely divided spherical or substantially spherical particles in which the average particle diameter less than about one micrometer.

As used herein "thermally degradable polymeric organic binders" are naturally occurring or synthetic polymers which degrade when subjected to heat. Useful thermally degradable polymeric organic binders for use in this invention are also not critical and can also vary widely. Organic polymer binders for use in the practice of this invention preferably are capable of providing a stable colloidal suspension with the one or more non-conducting materials and one or more organic solvents, and is preferably thermally degradable when heated at temperature of at least about 300° C., and most preferably at a temperature from about 300° C. to about 600° C. to leave a substantially uniform sintered coating of the finely divided non-conductive material bonded to one or more surfaces of the metal. Polymers which do not substantially completely thermally degrade or which leave decomposition products which interfere with the capacitive capability of the capacitor are not preferred for use. In general, any naturally occurring or synthetic polymeric or elastomeric material can be used. Illustrative of such useful polymers are $\alpha,\beta$-unsaturated olefins such as polyvinyl alcohol, polyacrylates, polypropylene, polymethacrylates, polyvinyl chloride, polyethylene, and the like; polyethers; polyesters such as polyethylene terephthalate, polybutylene terephthalate and the like; polyamides such as nylon-11, nylon-12, nylon-6, nylon-66 and the like; polysulfones; polyphenylene oxides; cellulose based polymers, such as methyl cellulose ethers, ethylpropyl cellulose ethers and hydroxypropyl cellulose ethers; and the like.

Organic solvents used in the practice of this invention are not critical, and can vary widely. The only requirement is that the solvents are capable of dissolving the thermally degradable polymeric organic binders and capable of dispersing the one or more finely divided non-conductive materials so as to form a colloidal suspension or dispersion. In the preferred embodiments of the invention, organic solvents are those which volatilize when heated to a temperature of from about 50° C. to about 250° C. at atmospheric pressure, and in the particularly preferred embodiments organic solvents are those which volatilize when heated to a temperature of from about 75° C. to about 150° C. at atmospheric pressure. Amongst these particularly preferred embodiments most preferred are those organic solvents which volatilize when heated to a temperature of from about 90° C. to about 120° C. at atmospheric pressure. Illustrative of useful solvents are alcohols, esters, ketones, aldehydes, hydrocarbons and like organic solvents.

The amounts of the various ingredients in the suspension employed in the first step of the process of this invention can vary widely. In general, the lower the concentration of suspended non-conductive materials in the suspension the more often the suspension must be applied to the metal to provide a given thickness of such bonded/sintered non-conductive material in the final capacitors; and conversely, the higher the concentration of suspended non-conductive materials in the suspension the less often the suspension must be applied to the metal to provide a given thickness of bonded/sintered non-conductive material in the suspension. In general, the concentration of organic solvents in the suspension will vary from about 5 to about 50 weight percent, the concentration of the non-conductive materials in the suspension will vary from about 40 to about 85 weight percent, and the concentration of polymeric binders in the suspension will vary from about 1 to about 15 weight percent based on the total weight of the suspension. In the preferred embodiments of the invention, the concentration of organic solvents in the suspension will vary from about 10 to about 45 weight percent, the concentration of non-conductive materials in the suspension will vary from about 45 to about 80 weight percent, and the concentration of polymeric binders in the suspension will vary from about 1 to about 10 weight percent. In the particularly preferred embodiments, the concentration of organic solvents in the suspension is from about 20 to about 40 weight percent, to concentration of non-conductive materials in the suspension is from about 50 to about 75 weight percent and the concentration of polymeric binders in the suspension is from about 1 to about 5 weight percent. All weight percents are based on the total weight of the suspension.

Metals used in step one of the process of this invention can vary widely. Generally, such metals will be those normally used in electrical devices for forming conductive elements. Illustrative of such metals are gold, palladium, iron, copper, platinum, aluminum, nickel, silver and the like. Copper is the conductive material used in the preferred embodiments of this invention. The shape of the metal is not critical and can vary widely. Usually however, the material is shaped in the form of a planar strip and the composition is applied to one or more planar surfaces.

The suspension is applied to one or more surfaces of the metal in a predetermined pattern. The suspension can be applied over all of the surfaces or over a portion thereof. Any suitable technique useful for applying a suspension to the surface of a solid material can be used. Illustrative of useful techniques are screen printing, pad printing, dipping, spraying and the like. Such techniques of applying suspensions to a substrate are well known in the art and will not be described herein in great detail. The suspension can be applied in a single application or multiple applications can be made depending on the desired thickness of the layer of non-conductive material in the finished product.

The amount of the suspension applied to the metal at any particular situs will vary widely depending on the desired thickness of the non-conductive material in the final capacitor, and the desired capacitance capability of the capacitor. In general, the devices' capacitance will increase with increasing dielectric constant of the non-conductive material and will decrease with increasing thickness of the applied layer of non-conductive material; and conversely the devices capacitance will decrease with decreasing dielectric constant of the non-conductive material and will increase with decreasing thickness of the applied layer of non-conductive material. The amount of the suspension applied to the metal is sufficient, usually, to provide a layer of sintered non-conductive material bonded to the metal of a thickness of at least about 20 microns. In the preferred embodiments of the invention, the amount applied is sufficient to provide a layer of non-conductive material having a thickness of from about 25 microns to about 85 microns, and in the particularly preferred embodiments, the amount applied is sufficient to provide layer of non-conductive material having a thickness of from about 30 microns to about 70 microns. Amongst these particularly preferred embodiments of this invention most preferred are those embodiments in which the amount of suspension applied to the metal is sufficient to provide a layer of sintered non-conductive material bonded to the metal having a thickness of from about 40 microns to about 60 microns.

In the second step of the process of this invention, the metal to which the suspension has been applied in the desired pre-determined pattern and in the desired amount heated at a temperature and for a time sufficient to remove substantially all of the organic solvent from the applied suspension and to sinter the non-conductive material, and to bond the sintered material to the metal substrate or substrates as the case may be. In the preferred embodiments of the invention, the heating step is divided into two portions. In these preferred embodiments, the metal substrate to which the suspension has been applied is first heated to a temperature sufficient to volatilize the solvents from the suspension, preferably in less than about one hour without disturbing the integrity of the remaining composition to form a coating of a composition containing essentially no solvent and which comprises the finely divided non-conductive material and the binders coated on the surface of the substrate in the pre-determined pattern. The heating step can be carried out in an air atmosphere, or in an atmosphere of non-oxidizing gas. Obviously, this heating temperature can vary widely depending on the volatilization temperature of the particular solvent or solvents employed. Usually, however, the heating step is carried out at a temperature equal to or less than about 350° C. In the preferred embodiments using preferred solvents, this heating step is carried out at a temperature of from about 50° C. to about 250° C. at atmospheric pressure, and in the particularly preferred solvents at a temperature of from about 75° C. to about 150° C. at atmospheric pressure. In the most preferred embodiments of the invention employing most preferred solvents, the first part of the heating step is carried out at a temperature of from about 90° C. to about 120° C. at atmospheric pressure.

In the second step of the split heating procedure the metal and coated composition from which the solvents have been substantially removed are heated in the presence of one or more non-oxidizing gases, such as argon, nitrogen, hydrogen and the like at a temperature and for a time sufficient to degrade substantially all of the polymer organic binders in the composition and sinter the finely divided non-conductive material and bond same to one or more surfaces of the metal as the case may be, to produce a substantially uniform coating of finely divided non-conductive material on one or more surfaces of the metal. The heating temperature employed in the second part of the split heating step can vary widely and will depend on the particular polymer binders, non-conductive materials and metals employed. In general, the heating temperature should be below the melting point of the metal. In the preferred embodiments of the invention, employing preferred binders, non-conductive materials and metals, the heating temperature is from about 300° C. to about 1500° C.

In the third step of the method of this invention, a suspension of a finely divided metal, as for example the metal used as the solid metal substrate, such as copper, iron, aluminum, palladium, platinum and the like, and containing one or more organic solvents having one or more polymeric binders dissolved therein is applied to surface of the sintered and bonded non-conductive material. The combination is thereafter heated to volatilize substantially all of the solvents from the suspension and to degrade substantially all of the binders thereby sintering the finely divided metal and bonding said sintered metal to the surface of the non-conductive material. The suspension can be applied to one or more surfaces of sintered and bonded non-conductive material in a pre-determined pattern. The suspension can be applied over all of the surfaces or a portion thereof using the same techniques employed in the suspension application step 1. The suspension can be applied in a single application or multiple applications can be made depending on the desired thickness of the layer of metal in the finished capacitor. The components and the relative amounts of the components of the suspension are as used in the suspension of step 1.

In an alternative embodiment of the process of this invention, the combination of the metal and coated composition are used directly in the third step of the process. In this procedure, the thermal degradation of the binders and the sintering and heat bonding of both the sintered non-conductive layer and the sintered metal layer are accomplished in a single high temperature second part of the split heating step.

The volatilization and sintering procedure used in step 3 are essentially the same as used in step two of the process of this invention in heating the suspension of the non-conductive material to remove the solvents, and sintering and bonding the resulting composition to the surface of the solid conductive material.

As in the case of the earlier heating step 2, the heating procedure of step 3 is preferably carried out in two stages. In the first stage of the heating procedure, the applied suspension is heated to a temperature and for a time which is sufficient to volatilize the one or more solvents from the applied suspension. In the second stage of the heating procedure, the substrate coated with the dried suspension is heated at a temperature and for a time which is sufficient to sinter the finely divided metal, and bond the sintered metal to the surface of the non-conductive layer. In the case of the alternative embodiment of the process of this invention the coated substrate is also heated to a temperature and for a time sufficient to sinter the finely divided non-conductive material and bond the material to the surface of the metal substrate. Usually in the case of the alternative embodiment, the coating of the finely divided metal and the coating of the non-conductive material are sintered and bonded using substantially the same heating conditions.

The thickness of the conductive layer is not critical and can vary widely. Usually, the layer has a thickness of from about 0.005 to about 0.075 mm. In the preferred embodiments of the invention the conductive layer has a thickness of from about 0.01 to about 0.06 mm, and in the particularly preferred embodiments of the invention has a thickness of from about 0.015 to about 0.05 mm. Amongst these particularly preferred embodiments most preferred are those embodiments in which the conductive layer has a thickness of from about 0.02 to about 0.03 mm.

The process of this invention can be used to manufacture capacitive devices of this invention, which devices can be used in many types of electrical devices, such as filtered connectors. In a filter connector incorporating the capacitive device of this invention, the device can be mounted in an insulating body. Layer 12 functions as the ground plane and is connected to same ground electrode. The connector also includes a plurality of contacts, normally corresponding in number to the number of layered structures 14. The contacts will include same means for providing electrical contact between the contact and a corresponding layered structure 14, preferably same sort of spring element.

The following specific examples are presented to more particularly illustrate the invention.

EXAMPLE I

A copper strip (0.5"×1"×0.03") (0.127 cm×0.254 cm×0.0076 cm) was cleaned in an 8% aqueous sodium hydroxide solution, and thereafter rinsed in 10% aqueous sulfuric acid solution. The strip was then wiped dry with a lint free cloth. A dielectric ink (#4510 manufactured and sold by Electro-Science Laboratories) containing principally barium titanate, a polymer binder, and an organic solvent was screen printed onto the copper strip in a square pattern with 8 mm edges. After drying for 25 minutes at 100° C., the sample was placed in a 950° C. tube furnace which was continually flushed with nitrogen containing less than 2 ppm oxygen. After 30 minutes, the sample was transferred to an unheated portion of the tube, and allowed to cool under a nitrogen atmosphere. A conductive ink of silver/palladium (ESL 9637B manufactured and sold by Electro-Science Laboratories) was then printed onto the dielectric in a 4 mm square pattern. After drying at 100° C. for 25 minutes the sample was fired as previously described for 30 minutes at 850° C. Adhesion between layers (copper/dielectric, and dielectric/silver palladium conductor) was excellent, and capacitance measured 1500 pF±10% from 100 Hz to 10 MHz with a dissipation factor of less than 0.04.

EXAMPLES II to V

General Procedure

A metal strip (0.5"×1"×0.03") (0.127 cm×0.254 cm×0.0076 cm) was rinsed in an 8% aqueous sodium hydroxide solution followed by a water rinse. The strip was then dipped in a 10% aqueous sulfuric acid solution followed by a rinse in water. The strip was then patted dry with a lint-free cloth. A dielectric ink containing a dielectric material, a polymer binder and an organic solvent was screen printed onto the metal strip in a square with 8 mm edges. After drying for 25 minutes at 120° C., a conductive ink was then printed onto the dielectric ink in a 4 mm square pattern. After drying at 120° C. for 25 minutes the sample was fired as previously described for 30 minutes at 950° C. The operative parameters of this preparative procedure are set forth in the following Table I.

TABLE I

| Ex. No. | Metal Substrate | Dielectric Ink | Conductive Ink |
| --- | --- | --- | --- |
| II | Copper | Remex-1930[2] | Remex-5814[3] |
| III | Alloy 725[1] | Remex-1930 | Remex-5814 |
| IV | Copper | ESL 4510[4] | Cermalloy 7031[5] |

TABLE I-continued

| Ex. No. | Metal Substrate | Dielectric Ink | Conductive Ink |
|---|---|---|---|
| V | Copper | ESL 4510 | Cermalloy 7129[6] |

[1]"Alloy 725" is an alloy containing nominally 88.2% by weight copper, 9.5% by weight nickel, and 2.3% by weight tin.
[2]"Remex-1930" is a barium titanate based dielectric ink manufactured and sold by the Remex Corporation, Feasterville, PA.
[3]"Remex-5814" is a copper based conductive ink manufactured and sold by the Remex Corporation, Feasterville, PA.
[4]"ESL-4510" is a barium titanate base dielectric ink manufactured and sold by Electro-Science Laboratories, Pennsauken, NJ.
[5]"Cermalloy 7031" is a copper based conductive ink manufactured and sold by Cermalloy Inc., West Conshohocken, PA.
[6]"Cermalloy 7129" is a copper based conductive ink manufactured and sold by Cermalloy Inc, West Conshohocken, PA.

The capacitance and dissipation factor of the capacitors of Example II to VI were measured with a Hewlett-Packard Model 4192A LF Impedance Analyzer using a one volt RMS test signal. The results of these measurements are set forth in the following Table II.

TABLE II

| Ex. No. | Capacitance (1 MH$_z$) | Dissipation |
|---|---|---|
| II | 1050 pF | 0.04 |
| III | 470 pF | 0.03 |
| IV | 2700 pF | 0.04 |
| V | 4700 pF | 0.07 |

What is claimed is:

1. A capacitive element which comprises: a laminated body comprising a metal substrate having one or more layered structures heat bonded to all or a portion of the surfaces thereof, each of said structures comprising a nonconductive layer comprised of sintered finely divided barium titanate and one or more glasses selected from the group consisting of alkali metal borates, silicates and germanates heat bonded to said metal substrate, and a metal conductive layer comprised of a sintered finely divided metal heat bonded to said nonconductive layer.

2. A capacitive element according to claim 1 wherein said first metal substrate is composed of copper, iron, platinum, aluminum, silver, gold, nickel, palladium or an alloy thereof.

3. A capacitive element according to claim 2 wherein said metal substrate is composed of copper.

4. A capacitive element according to claim 1 wherein the thickness of said metal substrate is from about 0.025 mils to about 0.75 mm.

5. A capacitive element according to claim 4 wherein said thickness is from about 0.075 to about 0.6 mm.

6. A capacitive element according to claim 5 wherein said thickness is from about 0.125 to about 0.5 mm.

7. A capacitive element according to claim 6 wherein said thickness is from about 0.2 to about 0.4 mm.

8. A capacitive element according to claim 1 wherein the thickness of said non-conductive layer is from about 0.020 to about 0.10 mm.

9. A capacitive element according to claim 8 wherein said thickness is from about 0.025 to about 0.085 mm.

10. A capacitive element according to claim 9 wherein said thickness is from about 0.030 to about 0.070 mm.

11. A capacitive element according to claim 10 wherein said thickness is from about 0.040 to about 0.060 mm.

12. A capacitive element according to claim 1 wherein said metal conductive layer is composed of a metal selected from the group consisting of copper, nickel, gold, palladium, platinum, iron, aluminum, silver, and alloys thereof.

13. A capacitive element according to claim 12 wherein said metal is selected from the group consisting of copper, silver, palladium and an alloy thereof.

14. A capacitive element according to claim 13 wherein said metal is copper.

15. A capacitive element according to claim 1 wherein the thickness of said second metal conductive layer is from about 0.005 to about 0.075 mm.

16. A capacitive element according to claim 15 wherein said thickness is from about 0.01 mm to about 0.06 mm.

17. A capacitive element according to claim 16 wherein said thickness is from about 0.015 to about 0.05 mm.

18. A capacitive element according to claim 17 wherein said thickness is from about 0.02 to about 0.03 mm.

19. A capacitive element according to claim 1 wherein the thickness of said metal substrate is greater than the thickness of each of said non-conductive layer and said metal conductive layer.

20. A capacitive element according to claim 19 wherein the thickness of said metal substrate is at least two times the thickness of each of said non-conductive layer.

21. A capacitive element according to claim 1 wherein said non-conductive layer consists essentially of barium titanate and one or more glasses selected from the group consisting of alkali metal borates, silicates and germanates.

22. A capacitive element according to claim 1 wherein said conductive layer consists of barium titanate and one or more glasses selected from the group consisting of alkali metal borates, silicates and germanates.

23. A capacitive device according to claim 1 wherein said alkali metal is lithium or potassium.

24. A capacitive element according to claim 23 wherein said alkali metal is lithium.

25. A capacitive element according to claim 24 wherein said glasses are selected from the group consisting of alkali metal borates and germanates.

26. A capacitive element according to claim 25 wherein said glasses are selected from the group consisting of alkali metal borates.

27. A capacitive element according to claim 26 wherein said alkali metal is selected from the group consisting of lithium and potassium.

28. A capacitive element according to claim 27 wherein alkali metal is lithium.

29. A capacitive element according to claim 1 wherein said glasses are selected from the group consisting of $LiBO_2$, $Li_2B_8O_{13}$ and $Li_2O_{(0.16)}B_2O_{3(0.74)}SiO_{2(0.10)}$.

30. A capacitive element according to claim 29 wherein said glasses are selected from the group consisting of $LiBO_2$ and $Li_2B_8O_{13}$.

31. A capacitive element according to claim 30 wherein said non-conductive layer comprises $LiB_8O_{13}$ as the alkali metal borate glass.

32. A capacitive element according to claim 29 wherein said substrate is copper.

33. A capacitive element according to claim 1 wherein the amount of said glasses contained in said layer is equal to or less than about 5 vol % based on the total volume of the glasses and barium titanate in said layer.

34. A capacitive element according to claim 33 wherein said amount is equal to or less than about 2.5 vol %.

* * * * *